United States Patent
Hahn et al.

(10) Patent No.: US 9,946,848 B2
(45) Date of Patent: *Apr. 17, 2018

(54) SOFTWARE PROTECTION USING AN INSTALLATION PRODUCT HAVING AN ENTITLEMENT FILE

(75) Inventors: Timothy J. Hahn, Cary, NC (US); Bernard P. Palmer, Jr., Marietta, GA (US); Michael P. Waidner, Golden Bridge, NY (US); James J. Whitmore, Carlisle, PA (US)

(73) Assignee: International Business Machines Corporation, Armonk, NY (US)

( * ) Notice: Subject to any disclaimer, the term of this patent is extended or adjusted under 35 U.S.C. 154(b) by 1467 days.

This patent is subject to a terminal disclaimer.

(21) Appl. No.: 12/393,242

(22) Filed: Feb. 26, 2009

(65) Prior Publication Data

US 2010/0218182 A1 Aug. 26, 2010

(51) Int. Cl.
G06F 21/10 (2013.01)
G06F 21/12 (2013.01)
H04L 9/32 (2006.01)

(52) U.S. Cl.
CPC ............ *G06F 21/10* (2013.01); *G06F 21/105* (2013.01); *G06F 21/12* (2013.01); *H04L 9/3247* (2013.01);
(Continued)

(58) Field of Classification Search
USPC ........................................ 705/59; 726/26-33
See application file for complete search history.

(56) References Cited

U.S. PATENT DOCUMENTS

| 5,416,840 A | 5/1995 | Cane et al. |
| 5,509,074 A | 4/1996 | Choudhury et al. |

(Continued)

FOREIGN PATENT DOCUMENTS

| WO | WO 95/34857 | 12/1995 |
| WO | WO 2006/031723 | 3/2006 |
| WO | 2006101765 | 9/2006 |

OTHER PUBLICATIONS

Samtani, Ongoing Innovation in Digital Watermaking, Web Technologies, pp. 92-94, Mar. 2009.
(Continued)

*Primary Examiner* — Tsan-Yu J Huang
(74) *Attorney, Agent, or Firm* — Daniel P. Morris; Ryan, Mason & Lewis, LLP

(57) ABSTRACT

Techniques for establishing entitlement to a computer program product are provided, and include providing a client identity in a registration process to produce an entitlement file, obtaining an encoded version of a computer program product, and transforming the computer program product into an installation product in a computer storage medium, wherein the installation product comprises the entitlement file to establish entitled use of the computer program product. Also, techniques for facilitating security compliance of a computer program product include providing an encoded version of a computer program product, and providing an installation product builder for the computer program product, wherein the installation product builder creates an installation product in a computer storage medium using a client identity and the encoded version of the computer program product during a registration process, and wherein the created installation product comprises an entitlement file to facilitate security compliance of the computer program product.

18 Claims, 10 Drawing Sheets

(52) U.S. Cl.
CPC .... *H04L 9/3263* (2013.01); *G06F 2221/0737* (2013.01); *H04L 2209/60* (2013.01); *H04L 2209/68* (2013.01)

(56) References Cited

U.S. PATENT DOCUMENTS

| | | | |
|---|---|---|---|
| 5,629,980 A * | 5/1997 | Stefik et al. | 705/54 |
| 5,864,620 A | 1/1999 | Pettitt | |
| 5,892,900 A | 4/1999 | Ginter et al. | |
| 5,903,882 A | 5/1999 | Asay et al. | |
| 5,935,243 A | 8/1999 | Hasebe et al. | |
| 6,108,420 A | 8/2000 | Larose et al. | |
| 6,195,432 B1 | 2/2001 | Takahashi et al. | |
| 6,233,684 B1 | 5/2001 | Stefik et al. | |
| 6,236,971 B1 | 5/2001 | Stefik et al. | |
| 6,292,569 B1 | 9/2001 | Shear et al. | |
| 6,466,920 B1 | 10/2002 | Okayama et al. | |
| 6,477,436 B1 | 11/2002 | Dean et al. | |
| 6,477,649 B2 | 11/2002 | Kambayashi et al. | |
| 6,708,157 B2 | 3/2004 | Stefik et al. | |
| 6,714,921 B2 | 3/2004 | Stefik et al. | |
| 6,904,523 B2 | 6/2005 | Bialick et al. | |
| 6,931,545 B1 | 8/2005 | Ta et al. | |
| 6,937,726 B1 | 8/2005 | Wang | |
| 6,959,290 B2 | 10/2005 | Stefik et al. | |
| 7,006,964 B2 | 2/2006 | Aaltonen et al. | |
| 7,017,189 B1 | 3/2006 | DeMello et al. | |
| 7,024,696 B1 | 4/2006 | Bahar | |
| 7,028,009 B2 | 4/2006 | Wang et al. | |
| 7,043,453 B2 | 5/2006 | Stefik et al. | |
| 7,055,040 B2 | 5/2006 | Klemba et al. | |
| 7,062,468 B2 | 6/2006 | Hillegass et al. | |
| 7,069,451 B1 | 6/2006 | Ginter et al. | |
| 7,085,741 B2 | 8/2006 | Lao et al. | |
| 7,136,838 B1 * | 11/2006 | Peinado et al. | 705/59 |
| 7,162,633 B2 | 1/2007 | Wang et al. | |
| 7,165,174 B1 | 1/2007 | Ginter et al. | |
| 7,174,568 B2 | 2/2007 | Chatani et al. | |
| 7,222,104 B2 | 5/2007 | Tadayon et al. | |
| 7,266,704 B2 | 9/2007 | Levy | |
| 7,269,445 B2 | 9/2007 | Natsuno et al. | |
| 7,290,144 B1 | 10/2007 | Kitaj et al. | |
| 7,290,699 B2 | 11/2007 | Reddy et al. | |
| 7,299,171 B2 | 11/2007 | Ta et al. | |
| 7,707,405 B1 | 4/2010 | Gilman et al. | |
| 7,734,550 B1 | 6/2010 | Bennett et al. | |
| 8,510,861 B2 | 8/2013 | Eriksson et al. | |
| 8,620,817 B2 * | 12/2013 | Tabet | 705/59 |
| 2001/0044782 A1 * | 11/2001 | Hughes et al. | 705/59 |
| 2001/0051928 A1 | 12/2001 | Brody | |
| 2002/0124245 A1 | 9/2002 | Maddux et al. | |
| 2002/0138441 A1 | 9/2002 | Lopatic | |
| 2003/0088516 A1 | 5/2003 | Remer et al. | |
| 2003/0149670 A1 | 8/2003 | Cronce | |
| 2003/0233483 A1 | 12/2003 | Melchione et al. | |
| 2005/0044359 A1 | 2/2005 | Eriksson et al. | |
| 2005/0165657 A1 | 7/2005 | Aichroth et al. | |
| 2005/0246285 A1 | 11/2005 | Chakravarthy et al. | |
| 2007/0011748 A1 * | 1/2007 | Tiwari | 726/26 |
| 2007/0094091 A1 | 4/2007 | Chabourov et al. | |
| 2007/0169049 A1 | 7/2007 | Gingell et al. | |
| 2007/0198423 A1 | 8/2007 | Carbone et al. | |
| 2007/0226150 A1 | 9/2007 | Pietrzak et al. | |
| 2008/0071689 A1 | 3/2008 | Tabet | |
| 2009/0199305 A1 * | 8/2009 | Michiels et al. | 726/30 |

OTHER PUBLICATIONS

Business Software Alliance, http://www.bsa.org.
Software & Information Industry Association, http://www.siia.net.

* cited by examiner

FIG. 6

```
-<Contacts>
  -<Contact Id="2273b2ea-630a-11d8-a859-bd78f1e1c964">                                        VENDOR INFORMATION  604
    <Keys Address1="ISS Customer Operations" Address2="6303 Barfield Road" City="Atlanta, GA" Country="USA" Email="keys@iss.net"
    Fax="404.236.2603" Phone="404.236.2600" PostCode="30328" Weburl="https://www1.iss.net/wos"> </Keys>
    <ClientServices Address1="ISS Client Services" Address2="6303 Barfield Road" City="Atlanta, GA" Country="USA" Email="clientservices@iss.net"
    Fax="404.236.2615" Phone="404.236.2600" PostCode="30328" Weburl="http://www.iss.net/support/"> </ClientServices>
    <Support Address1="ISS Technical Support" Address2="6303 Barfield Road" City="Atlanta, GA" Country="USA" Email="support@iss.net"
    Fax="404.236.2615" Phone="404.236.2700" PostCode="30328" Weburl="http://www.iss.net/support/"> </Support>
    <Version>1.0</Version>
    <OCN>17636801</OCN>
    <Timestamp>2004-02-19 13:33:38</Timestamp>
    <Serial>C3143122-A398-296A-FDC0-3DD7222AAC7E</Serial>
    <Source>ISS Atlanta</Source>
  -<sig:Signature>
    -<sig:SignedInfo>
      <sig:CanonicalizationMethod Algorithm="http://www.w3.org/TR/2001/REC-xml-c14n-20010315"> </sig:CanonicalizationMethod>
      <sig:SignatureMethod Algorithm="http://www.w3.org/2000/09/xmldsig#rsa-sha1"> </sig:SignatureMethod>   DIGITAL SIGNATURE ALGORITHM  606
      <sig:Reference URI="">
      -<sig:Transforms>
        <sig:Transform Algorithm="http://www.w3.org/TR/1999/REC-xpath-19991116">
        -<sig:XPath>
          not(ancestor-or-self::sig:Signature) and ((ancestor-or-self::node)[@Id="2273b2ea-630a-11d8-a859-bd78f1e1c964"])}
        </sig:XPath>
        </sig:Transform>
      </sig:Transforms>
      <sig:DigestMethod Algorithm="http://www.w3.org/2000/09/xmldsig#sha1"> </sig:DigestMethod>
      <sig:DigestValue> QwuMIZO49QsPI+Tx/Tq1NYYv7Wc= </sig:DigestValue>
      </sig:Reference>
    </sig:SignedInfo>                                                       DIGITAL SIGNATURE VALUE
    -<sig:SignatureValue>
    1zb0fuRipuGe2HN8wdFhn2yYb5qeYSsOzEM/91Pyzx/nNB98X77wkG2A00gsLu25a0cLiCqayB1u
    tWd5N1Vbz0DTXDXbgBaAWzXsY0uepTYEiyve31mURcm5YrbPWZU01nODbXWDHkAAkwYIiRNN5chN3ZB9+n7gs6NPG/bfmg=  608
    </sig:SignatureValue>
  </sig:Signature>
```

602

SOFTWARE PROTECTION USING AN INSTALLATION PRODUCT HAVING AN ENTITLEMENT FILE

FIELD OF THE INVENTION

Embodiments of the invention generally relate to information technology, and, more particularly, to anti-piracy techniques.

BACKGROUND OF THE INVENTION

Software piracy, that is, the illegal distribution or use of software, poses a problem to enterprises worldwide. In existing anti-piracy approaches, legal users can be impacted through additional steps during installation and operation of the software, additional hardware requirements (for example, security modules, additional servers to manage licenses, etc.), and through reduced performance (for example, because of regular online verification of licenses) and availability of the software (for example, accidentally shutting down a legal customer's software because of a failure of some license server).

Additionally, in existing approaches, production costs are typically increased due to additional code that needs to be integrated and tested, and also due to the additional infrastructure required to manage licenses, registration numbers, etc., as well as the implied increased number of support requests. Existing approaches to protecting software services focus on identity management and access management based on role, attributes and privileges. Such controls, however, can be rendered ineffective when the underlying agreements are ignored or breached, or when the terms of the agreement are not faithfully communicated to all users and uses over time.

SUMMARY OF THE INVENTION

Principles and embodiments of the invention provide techniques for software protection using an installation product having an entitlement file. An exemplary method (which may be computer-implemented) for establishing entitlement to a computer program product, according to one aspect of the invention, can include steps of providing a client identity in a registration process to produce an entitlement file, obtaining an encoded version of a computer program product, and transforming the computer program product into an installation product in a computer storage medium, wherein the installation product comprises the entitlement file to establish entitled use of the computer program product.

Additionally, an exemplary method (which may be computer-implemented) for establishing compliance for use of a computer program product, according to one aspect of the invention, can include steps of during creation of an installation product for the computer program product in a computer storage medium of a system, creating an entitlement record for the computer program, joining the entitlement file to the installation product, installing the computer program product in a computer storage medium of a system, and using the entitlement file to establish compliance for use of the computer program product, wherein the entitlement file is tamper evident.

Further, an exemplary method (which may be computer-implemented) for facilitating security compliance of a computer program product, according to one aspect of the invention, can include steps of providing an encoded version of a computer program product, and providing an installation product builder for the computer program product, wherein the installation product builder creates an installation product in a computer storage medium using a client identity and the encoded version of the computer program product during a registration process, and wherein the created installation product comprises an entitlement file to facilitate security compliance of the computer program product.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 6 is a diagram illustrating an exemplary portion of a sample signed extensible markup language (XML) entitlement file viewed via a Web browser, according to an embodiment of the present invention;

DETAILED DESCRIPTION OF EMBODIMENTS

Figure 1:
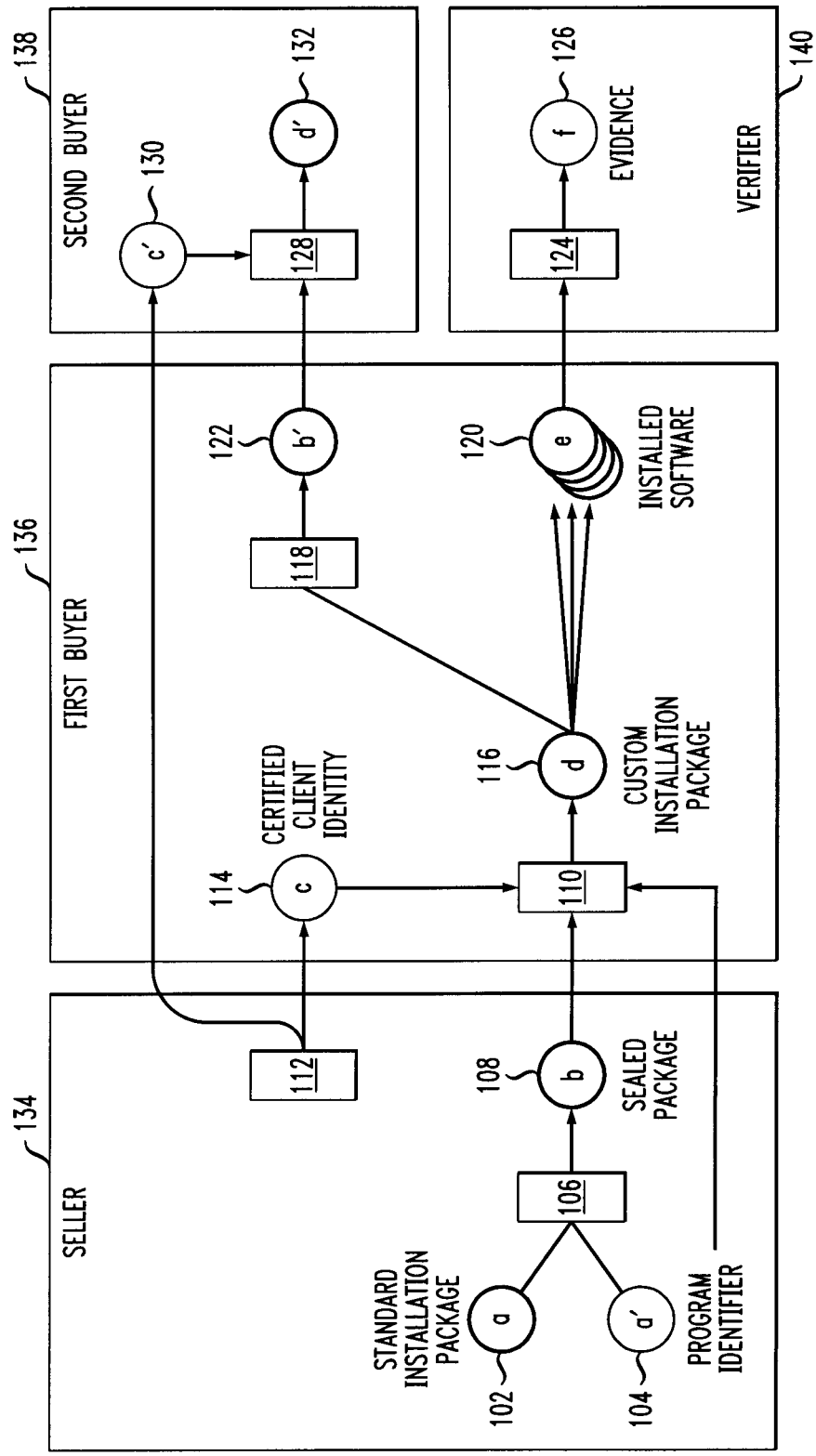
FIG. 1 is a diagram illustrating techniques for watermarking with an owner's identity, according to an embodiment of the present invention.

Principles of the invention include anti-piracy mechanisms. By way of example, one or more embodiments of the invention include pre-deployment registration. The techniques described herein also include allowing activation of a software program. For example, in one or more embodiments of the invention, there is a single key pair and a single certificate, which are generated by the software provider. The signature verification key can be self-certified by the software provider or certified by a public authority.

Also, in one or more embodiments of the invention, the "certified client identity" can be the legal name for the individual or the enterprise entity, as commonly found in a purchase contract. Additionally, a token can be used to identify the client, wherein the token is obtained from the program distributor and is used when the program is installed. Installation of the program can be accomplished by applying a signature key which generates the evidence. In one or more embodiments of the invention, the provider creates a unique digital signature for each instance of the entitlement information by, for example, invoking a cryptographic technique with the provider's private key. Digital signatures have been considered to be strong evidence of integrity in computing systems as long as those systems are built, operated and maintained with recognized practices.

A valid license can be, for example, a string signed by the legal owner and represents real evidence which cannot be forged. Such a scheme can be used to deter users from forwarding copies to other parties. Also, if software is resold, there is an explicit repacking mechanism to the buyer to use the software.

In one or more embodiments of the invention, a user obtains an encoded version of an installation package. This encoded version can be transformed into a normal installation package, and registration can occur during this transformation. As such, the installation package already includes the registration information, and the user can, from then on, install this package freely. Accordingly, the registration is done before installation.

The steps of registering a licensed program and the installation of the program can be separate and independent steps. Registration can be performed during the transformation of an encoded installation package into an un-encoded installation package. Also, both the encoded and the un-encoded installation package identify the legal (original or re-licensed) owner.

In one or more embodiments of the invention, registration can occur first and result in the receipt of an encoded installation file or medium that contains the licensed program (for example, "a") and a program identification (ID) (a'), both embedded together and encoded with the public key of the licensee. The licensee decodes the medium with its private key to receive clear versions of (a) and (a'). Independently, the licensee also has a separate clear copy of the program ID (a') from the licensor.

The licensee can compare the decoded version of (a') to the clear (a') to verify that the correct package is received. The licensee can also digitally sign (a'), the licensee's identity and other information, and embed that signature into the un-encoded installation package (a), obtaining a second installation package (d) that can be used over and over to install (a). The installation medium (d) contains an embedded copy of the licensee identity. Additionally, a provision can also be considered for allowing a subsequent licensee to create another installation medium (d) with the identity of the subsequent licensee embedded therein, or change the original licensee ID in an original medium (d).

As described herein, one or more embodiments of the invention minimize the risk and additional costs for legal users of a program, as well as minimize the additional costs for producing a program. Also, the techniques described herein deter pirates from forwarding their copies of software.

Further, one or more embodiments of the invention require legal users to go through a registration step that personalizes the copy of software so that a forwarded copy can be traced back to the pirate. Additionally, the techniques described herein can include a mechanism that checks whether a copy is licensed or not, and if so, by whom. Existing registration (or fingerprinting and/or watermarking) approaches assume that a user obtains an installation package, installs it, and registration happens either during registration or during operation (that is, registration is part of installation or operation). In one or more embodiments of the invention, the user obtains an encoded version of the installation package. This encoded version can be transformed into a normal installation package, and registration can occur during this transformation, resulting in an installation package that already includes the registration information. The user can, from then on install this package freely (that is, registration is done before installation).

The techniques described herein require no changes during production of the software, as the mechanism is added during encoding a normal installation package. For the user, it separates registration from installation, which means that installation and operation are not changed. The user can install the software as often as needed (and all installations will contain the registration info). The check whether a copy is licensed is safe against wrong accusations, that is, if it identifies a certain user, then it was indeed that user who did the registration. Additionally, when dealing with pirates, the techniques described herein provide that all illegally found copies point back to a pirate.

FIG. 1 is a diagram illustrating techniques for watermarking with an owner's identity, according to an embodiment of the present invention. By way of illustration, FIG. 1 depicts a standard installation package 102(a), a program identifier 104(a'), a sealed package 108(b), a certified client identity 114(c), a custom installation package 116(d), installed software 120(e) and evidence 126(f). In one or more embodiments of the invention, when the operation performed by block 124 follows accepted practices (for example, cryptographic operations), the proof or disproof of the claim can be considered to be reliable evidence 126 (for example, as described by the Digital Signature Guidelines of the ABA and/or other standards).

Figure 8:
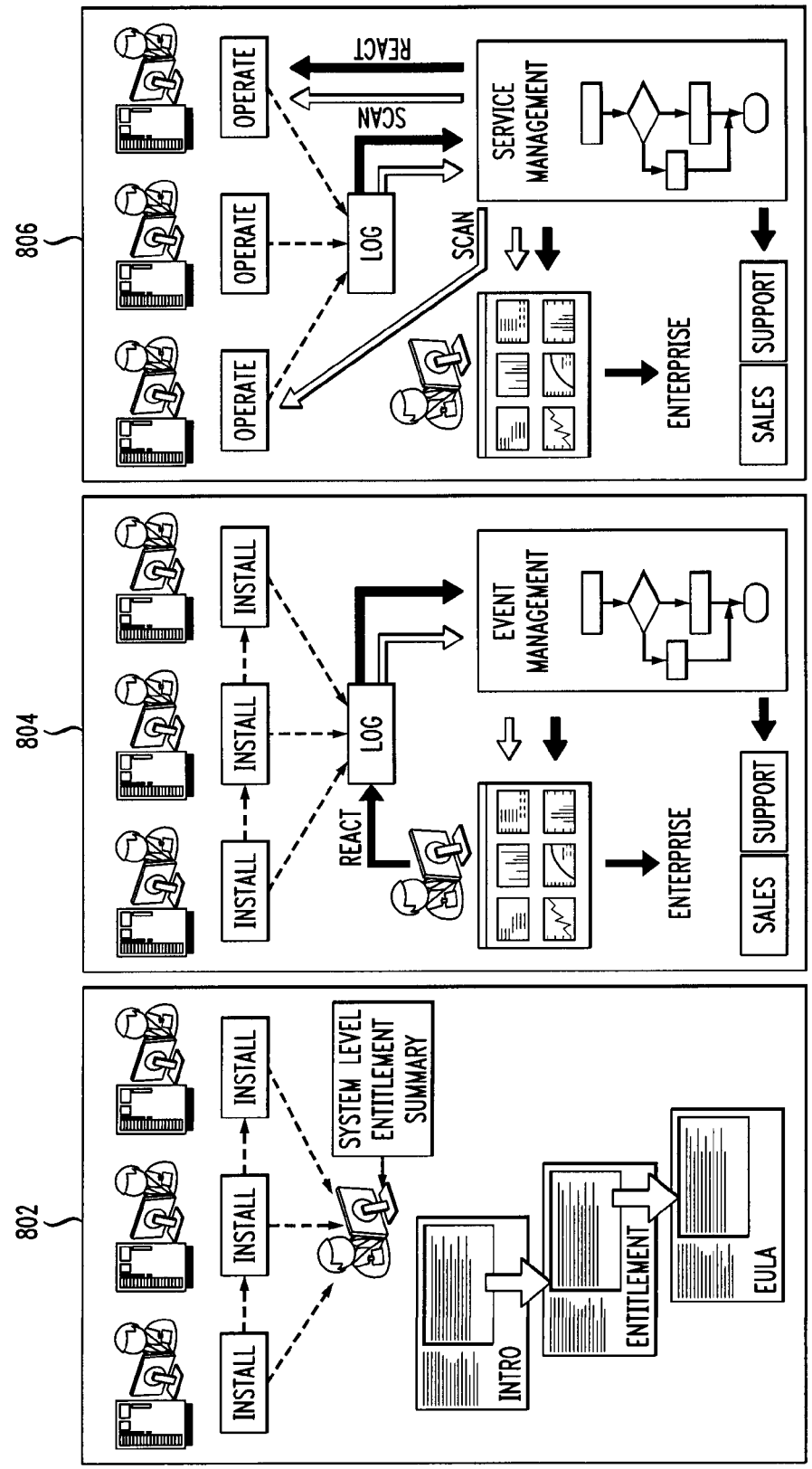
FIG. 8 is a diagram illustrating exemplary operating scenarios for signed entitlement files as an anti-piracy control, according to an embodiment of the present invention.

Additionally, in one or more embodiments of the invention, the entitlement file and/or record can be referenced and evaluated at any time after the installation is complete. FIG. 8, for instance, provides some examples.

By way of example, consider an arbitrary program 102(a) produced and sold by a seller 134, and then sold to a (first) buyer 136 (and, later, resold to a second buyer 138). Assume that the buyer 136 (and later also the second buyer 138) registers a priori with the seller 134, and obtains a certified client identity 114 (which is info that identifies them, plus cryptographic keys for a digital signature scheme, plus a certification from the seller or a third party). Such a process can occur in step 112, as depicted in FIG. 1. Also, a priori registration overcomes disadvantages of existing approaches. In existing approaches, once a software package leaves the vendor, no party (whether the sending party, the acquiring party, or a casual observer) can determine the history of ownership of the software or explicit contract terms for installation and use.

Before delivering the program 102(a), the seller 134 takes (a) and a description of the program 104(a'), and creates a sealed package 108(b) via step 106. For example, one can encrypt (a) and (a') using a fixed cryptographic key of a symmetric encryption scheme, or a key that is stored by the seller and sent to legal buyers on demand. Additionally, one or more embodiments of the invention include re-signing the entitlement file. Extracting (a) out of (b) can be a non-trivial task (for example, decrypting (b)). A natural and useful extension of this scheme can be to include a digital signature of the seller of (a) and (a') in (b), that is, combine this with code signing.

All buyers will obtain and use the same sealed package 108, that is, this is not specific of a seller-buyer relationship. The sealed package 108 can be, for example, downloaded. In the production and delivery process of the seller, (b) replaces (a). As a result, the impact on costs is minimal.

Step 110 is executed by the buyer 136 (also, one variation of the scheme assumes that the execution of step 110 is hosted by the seller 134 or a third party). Step 110 takes (b), the description (a') and the secret signature key from (c) as input, unseals (b), and obtains (a) and (a'). Also, step 110 compares the (a') provided by the buyer with the (a') found in (b), and if they do not match, the procedure stops. Further, step 110 signs (a'), the buyer's identity and other information, and embeds that signature into the installation package (a), obtaining another installation package 116(d).

There are various ways to perform the embedding. For example, one can create a separate license file with the signature. But, in one or more embodiments of the invention, any embedding mechanism known from software watermarking could be used. The signature can be found, for example, via step 124 in any installed version. If step 106 included a code signing step, then step 110 will additionally verify that code signature.

An extension of the embedding adds code so that whenever the software is installed and executed, the license information is put into a log file. Such logging code can also be added in step 106. Also, in step 124, the signature is extracted from installed software and turned into evidence 126(f). Because (f) is digitally signed, it cannot be forged, that is, only a party who knew (c) could have produced it. This ensures that the scheme is secure against wrong accusations.

Steps 118 and 128 are extensions that allow one to change the license from a first buyer 136 to a second buyer 138 in case the software gets resold. Components 122(b'), 130(c') and 132(d') are re-factored versions of components 108, 114 and 116, respectively.

Additionally, in one or more embodiments of the invention, a verifier 140 can be found in the process that transforms the software package 116 into the installed software 120. Also, verifying software can be part of the Install software 120. Further, in one or more embodiments of the invention, the verifier can be found in compliance software that would retrieve and check the entitlement file once the software has been installed.

One or more embodiments of the invention can also include specific demonstration software. As such, one can distinguish between "demo" and "production" versions. Both are identical, but the demo version is clearly recognizable as such (for example, a "This is a demo" string is included in all relevant screens (printed over all images, etc.)). There is no impact on normal operation and no risk of accidental shut down. With a demo version, commercial users may hesitate to use such a version for production purposes.

One or more embodiments of the invention can display warnings to a user (for example, "Unlicensed evaluation copy", etc.). Additionally, as illustrated in FIG. 1, each copy of (d) 116 or (e) 120 reveals the legitimate owner. Further, code that is delivered to clients and executed is authenticated, and removing a license invalidates a signature, increasing awareness for the risk. The evidence extraction in step 124, in one or more embodiments of the invention, does not produce evidence (f) 126 that points to an honest client. If the system is not corrupted, then step 124 will be successful and will point to the client whose identity was used in step 110. A failure in step 124 indicates a license violation.

Principles of the invention also include establishing entitlement and managing compliance for the use of software packages and software computing services. One or more embodiments of the invention include ensuring that entitlement agreements are accurately and effectively communicated and applied throughout the lifecycle of software and software services, thus reducing piracy and abuse of entitlement agreements.

The techniques described herein can include, by way of example, creating a tamper evident entitlement file and/or record for software assets and software services that includes the identity of the parties within an entitlement agreement and the terms of the entitlement agreement, as well as associating the tamper evident entitlement file to the software asset or the software service. For example, one or more embodiments of the invention can include a format for an encoded entitlement document (for example, XML) that includes, by way of example, a vendor identifier, a user identifier, transaction identifiers (such as date, time, contract number, etc.), an asset identifier (to include product name, service name, etc.), terms of entitlement (such as quantity, validity dates, service levels, etc.). One or more embodiments of the invention can additionally include a system for creating instances of the entitlement document with embedded integrity metrics (for example, digital signing using public and/or private key cryptographic operations).

The techniques detailed herein can also include applying the terms of the entitlement agreement throughout the lifecycle of the software asset or software service, based on the integrity and contents of the tamper evident entitlement file. For example, one or more embodiments of the invention can include techniques (for example, implemented in hardware, firmware or software) that examine the tamper evident entitlement file. The examination can include checking for integrity using public and/or private cryptographic operations (such as signature verification), checking the parties, checking of the terms of entitlement, etc. The details of the examination can be defined, for example, by the enterprise or technical requirements for the lifecycle event for the software or software service (such as installation, initialization, operation, management of software or software service, etc.). The actions taken as a result of the examination can also be defined by enterprise and technical requirements. The actions can include, for example, ignore, record, alert and deny.

Further, the techniques described herein include auditing software service intensive systems for compliance, based on the integrity and contents of a tamper evident entitlement file. For example, one or more embodiments of the invention can include scanning target systems for software and associated tamper evident entitlement files, scanning log files for software services, and taking actions based on enterprise or technical requirements. The actions taken as a result of the examination can be defined by enterprise and technical requirements, and such actions can include, for example, ignore, record, alert, and deny.

Figure 2:
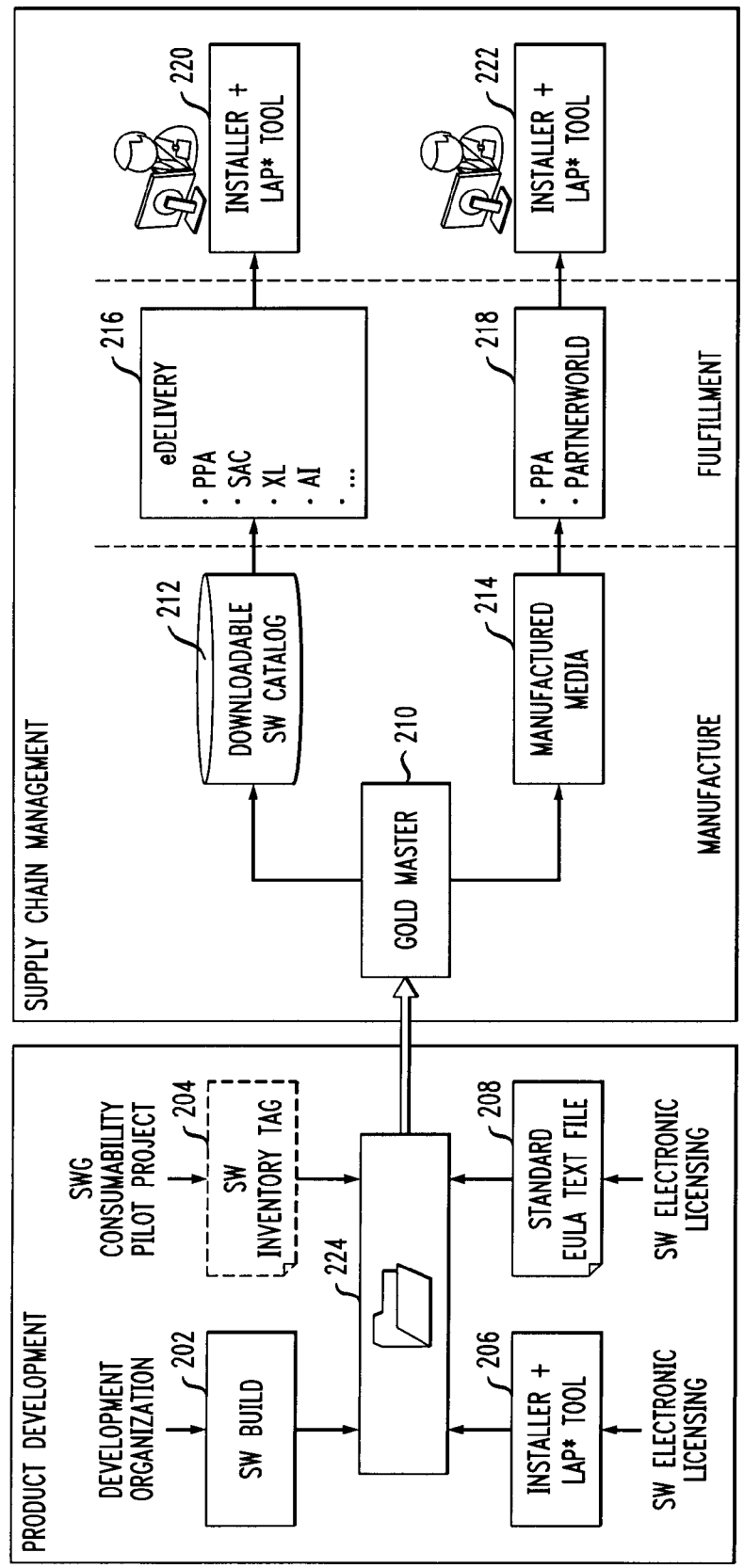
FIG. 2 is a diagram illustrating an example of a software delivery process with standard licensing end entitlement controls, according to an embodiment of the present invention.

FIG. 2 is a diagram illustrating an example of a software delivery process with standard licensing end entitlement controls, according to an embodiment of the present invention. By way of illustration, FIG. 2 depicts a product development side that includes a software (SW) build component 202 that receives development organization, and a SW inventory tag 204 that receives a software group (SWG) consumability pilot project. Also, FIG. 2 depicts an installer and license acceptance (LAP) tool 206 that receives SW electronic licensing, and a standard end user license agreement (EULA) text file 208 that also receives SW electronic licensing. The SW build component 202, the SW inventory tag 204, the installer and LAP tool 206 and the standard EULA text file 208 all provide input to the build 224 on the supply chain management side, which provides input to a gold master component 210. At various points in a software development process, the various elements of the software package are integrated into what is often called a "build;" that is, an instance of the software being developed. At some point, the build is determined to be final. The gold master 210 is created from the final or production-ready build.

FIG. 2 also depicts a downloadable SW catalog 212, manufactured media 214, an electronic delivery (eDelivery) component 216, a physical delivery component 218 and installer plus LAP tools 220 and 222. Component 212 can include a filing system or repository where one or more Gold Masters are stored. Such a filing system or repository can include, for example, a physical storage facility or warehouse and/or a computerized filing system or database. Component 214 includes an instance of a Gold Master that is encoded and stored on physical media that can be read by a computing system. The physical media can include, for example, a magnetic disk, a magnetic tape, a compact disc, a portable, pluggable storage device, etc.

Component 216 includes an enterprise system and the information technology and communication infrastructure that provides for electronic delivery of software. Such an enterprise system can perform multiple functions such as, for example, interaction with the requester, using exchange of digital information, authentication of the requester, determining the entitlement of the requestor based on the user credentials and stored enterprise data, reliable delivery of the encoded software, etc. Additionally, by way of example, component 216 can perform functions 106, 108, 110 and 112 as depicted in FIG. 1 for custom installation packages that are distributed electronically.

Component 218 includes an enterprise system and infrastructure that provides logistical support for the delivery of instances of physical media to authorized and entitled requestors. A representative example of component 218 can include an ordering system, a warehouse, an inventory system, a packing system, a shipping system (such as a postal service) and/or a tracking system. Also, by way of example, component 216 can perform functions 106, 108, 110 and 112 as depicted in FIG. 1 for custom installation packages that are distributed via physical media as described in component 214.

Component 220 includes the portion of the electronically delivered software package that interacts with the end user that facilitates the transformation of the custom installation package (as depicted, for example, in component 116 of FIG. 1) to an instance of installed software (for example, component 120 of FIG. 1). Additionally, component 222 includes the portion of the physical software package that interacts with the end user that facilitates the transformation of the custom installation package (for example, component 116 of FIG. 1) to an instance of installed software (for example, component 120 of FIG. 1).

Figure 3:
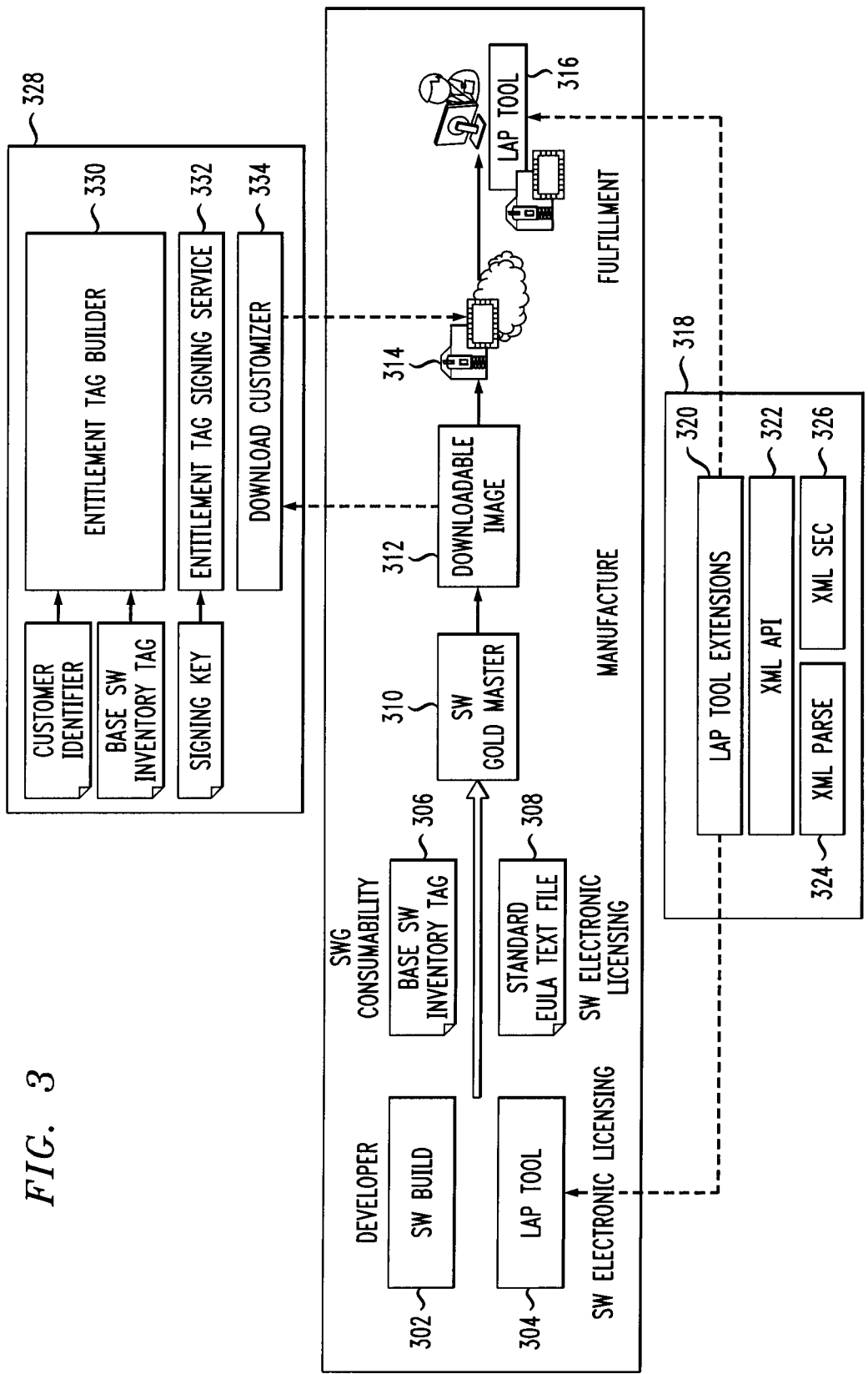
FIG. 3 is a diagram illustrating an example of an updated software delivery process with tamper-evident entitlement files, according to an embodiment of the present invention.

FIG. 3 is a diagram illustrating an example of an updated software delivery process with tamper-evident entitlement files, according to an embodiment of the present invention. By way of illustration, FIG. 3 depicts a SW build component 302, a LAP tool 304, a base SW inventory tag 306 and a standard EULA text file 308, which all provide input to a SW gold master component 310. Component 310 provides input to a downloadable image 312, which continues to component 314 and ultimately to a user and LAP tool 316. Component 314 represents a copy of the gold master, along with any associated content that may be provided in the delivery process.

Additionally, component 318, which includes LAP tool extensions 320, extensible markup language (XML) application programming interface (API) 322, an XML parse component 324 and an XMLsec component 326, provides input to LAP tools 304 and 316. The downloadable image 312 also provides input to component 328, which includes a downloaded customizer component 334, an entitlement tag signing service component 332 (which also receives a signing key) and an entitlement tag builder component 330 (which also receives a customer identifier and a base SW inventory tag). Also, in the entitlement tag signing service component 332, a cryptographic signing binds a package to a customer for each download request.

As depicted in FIG. 2 and FIG. 3, as well as being additionally detailed herein, a customer can receive (for example, via purchase) a computer program product or a computer program product offering (for example, a Gold Master 210 or 314). By way of example, a computer program product or a computer program product offering (for example, a Gold Master) can include an item such as component 108 in FIG. 1.

A computer program product or offering may be packaged and conveyed in many ways, for example, as determined in part by the computer program product designer and in part by the intended user, and where and how it will be used. In connection therewith, FIG. 2 and FIG. 3 illustrate that anti-piracy techniques can include a lifecycle view.

Figure 4:
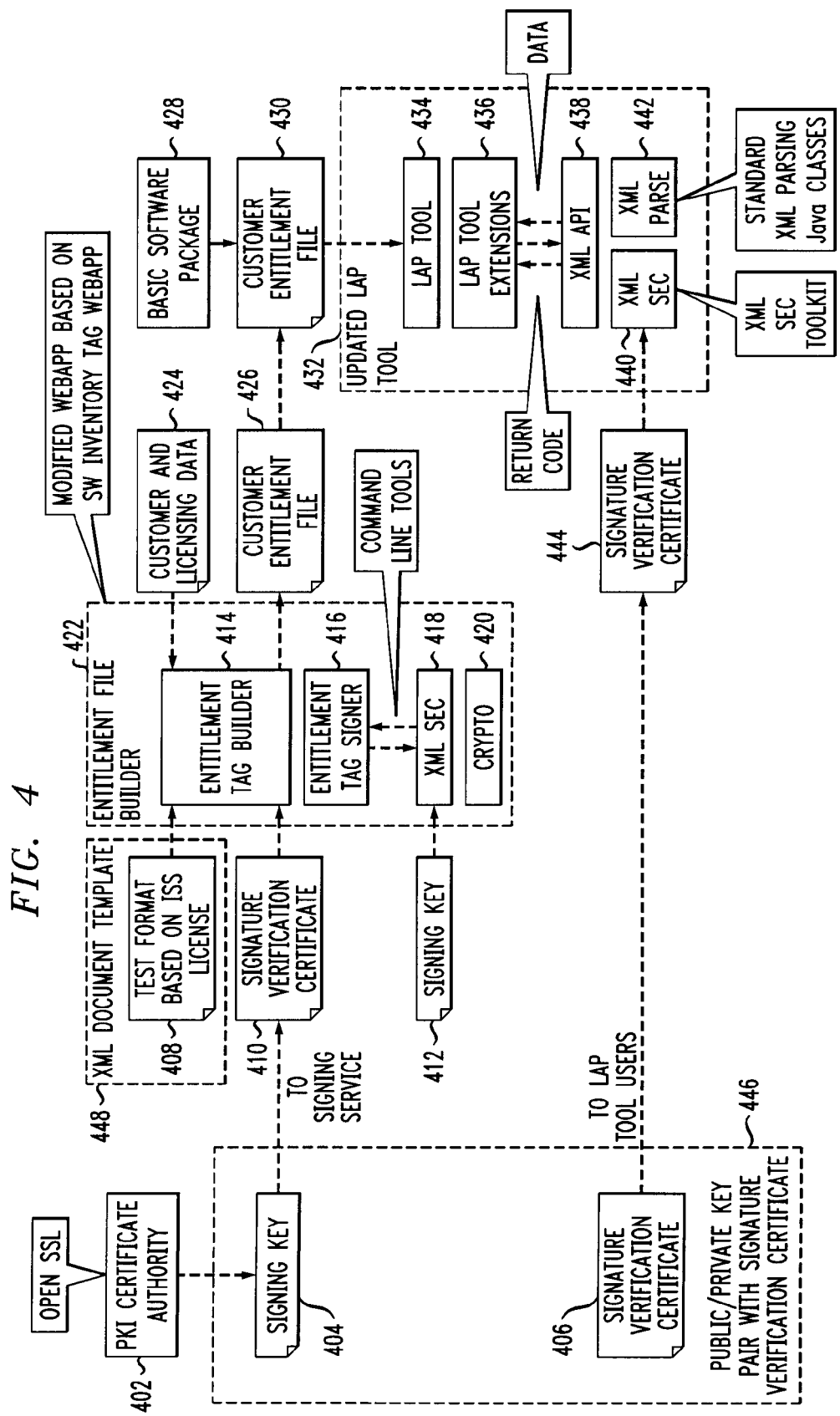
FIG. 4 is a diagram illustrating an example of the system of systems needed to achieve an exemplary implementation, according to an embodiment of the present invention.

FIG. 4 is a diagram illustrating an example of the system of systems and/or modules needed to achieve an exemplary implementation, according to an embodiment of the present invention. By way of illustration, FIG. 4 depicts public key infrastructure (PKI) certificate authority 402 (that can include, for example, OpenSSL), which provides input to a public and/or private key pair with signature verification certificate module 446. Module 446 includes a signing key 404 that provides input to signing service (for example, to signature verification certificate 410). Module 446 also includes a signature verification certificate 406 that provides input to LAP tool users (for example, to signature verification certificate 444).

As also depicted in FIG. 4, an extensible markup language (XML) document template 448 (including a test format based on an internet security systems (ISS) license 408), the signature verification certificate 410 and a signing key 412 provide input to an entitlement file builder 422. The entitlement file building 422 includes an entitlement tag builder 414, a cryptography component 420, and an entitlement tag signer 416 which interacts with (for example, exchanges command line tools) an XMLsec component 418. As depicted in FIG. 4, customer and licensing data 424 can be inputted to the entitlement tag builder 414. Also, the entitlement file builder 422 can include a modified web application (webapp) based on a SW inventory tag webapp.

Additionally, the entitlement file builder 422 can provide input to a customer entitlement file 426, which provides input to entitlement file 430. A basic software package 428 can also provide input to entitlement file 430. The customer entitlement file 430 provides input to an updated LAP tool 432, specifically to the LAP tool 434. The updated LAP tool 432 includes the LAP tool 434, an XMLsec component 440, an XML parse component 442, and LAP tool extensions 436 that interact with (for example, exchange return code and data) XML application programming interface (API) 438. The XML parse component 442 can include, for example, standard XML parsing Java classes. Also, the signature verification certificate 444 can provide input to the XMLsec component 440, which can also include an XMLsec toolkit.

The techniques described herein also include augmenting a software package with a tamper-evident binary data object that contains a combination of human readable and computing machine readable information. The tamper-evident data object may include information regarding the vendor, the software components, product or product assemblies in the package, the distribution channel, the intended recipient, the intended use, etc. Also, the tamper-evident feature of the data object can conform to a cryptographically signed XML object with signing authority, encryption and signing keys, and certain extensions that are suitable for the purpose of facilitating the conveyance of origination, receivership, licensing and use of the software package.

The existence, absence or attempted alteration of the tamper-evident data object in any installation, along with the interpretation of the information in the data object could be considered as partial evidence of compliance or non-compliance to the intentions of the originator and/or compliance with the terms and conditions of end user license agreement.

Also, one or more embodiments of the invention include generating an installation module that contains the software to be installed in a non-encrypted state, and a digitally-signed licensing module that contains licensing details (such as the vendor, the licensee, the date, the identity of the package to be installed, and any other desired information). This allows a detection of any alteration to the digitally-signed licensing module. At installation time, the installation module executes a policy that can be defined as determining if the licensing module has been altered and, if so, terminating the installation. If the licensing module has not been altered in any way, then one or more embodiments of the invention display, for the user, the licensing details from the licensing module and wait for the user to accept or discontinue the installation. By way of example, the content of the licensing module (a data file) can be displayed if the integrity of the module is verified.

If the integrity check of the licensing module fails, the user is notified and is directed to contact the vendor. For example, the integrity check pass or fail can generate an alert to be delivered to an operator screen or kick-off additional automation. Additionally, in one or more embodiments of the invention, the integrity protection on the licensing module can follows the guidelines in the form of a cryptographic hash of the data in the licensing module. By way of example, the cryptographic hash can follow any prevailing standard.

As described herein, one or more embodiments of the invention can be implemented within various scenarios for delivery of software. By way of example, a software package and/or computer program product can be transformed to many instances of installed software by one user or multiple users. Once installed, these instances can be invoked (operated) on every computer system where they have been installed.

With an electronic delivery component, users are authenticated and are authorized to download software and/or computer program products that match their channel and profile. With a physical delivery component, software media can shipped to authorized customers or distributed at promotional events. Once the software is received, the installation is controlled by packaging protections and a registration process. During or after initial installation, the original software media package or installed software images may be, for example, placed on servers, placed in team rooms, incorporated into a SW provisioning system, incorporated into a virtualized system, and/or shared with others. Additionally, in one or more embodiments of the invention, all of the copies made from a given installation product have the same entitlement file to provide traceability.

Non-compliance can be associated with over-deployment beyond the user's license entitlement, and piracy can be associated with copying, transfer, sale and use by unauthorized and un-entitled parties.

When analyzing user behavior (users can include individuals, employees, contractors, enterprises, enterprise partners, independent software vendors (ISVs), students, etc.), the spectrum of user behaviors can include the following. Expected behavior (wherein the current process relies upon good behavior) can include intent to comply with the contract terms and the end user license agreement when acquiring, installing, operating or evaluating software, and/or when acquiring, transferring or reselling software. Unknowing behavior (wherein the current process does not provide clear and complete information to users) can include violation of the contract terms and the end user license agreement when installing and operating software intended for someone else and/or when transferring or reselling software inappropriately.

Reckless behavior can include knowingly ignoring the consequences of violating the contract terms and the end user license agreement when installing and operating software intended for someone else, and/or when transferring or reselling software inappropriately. A purposeful violation can include intentional disregard of the contract terms, the end user license agreement or the intellectual property rights of the enterprise when one knowingly acquires, installs and operates software in violation of terms and conditions, and/or knowingly transfers or resells software in violation of terms and conditions.

The techniques detailed herein include minimizing the occurrence of unknowing behavior, reducing the likelihood of reckless behavior and providing reliable artifacts to be used as evidence of compliance, non-compliance or purposeful violation. In order to impact user behavior and provide reliable evidence, the installation process for software should provide clear, complete and trusted information to every user and/or administrator.

In existing approaches, a software installation process includes the following steps. A user selects and invokes the installation program, and the installation program presents an introductory panel. The user acknowledges the intent to install and the installation program presents the end user license agreement (EULA) information. The user acknowledges acceptance of the EULA and intent to continue, and the installation program completes the tasks of system preparation, software component transfer and configuration.

Note that the EULA information may only contain general terms for licensing and use of the software package, leading to unknowing violation. Also, the EULA text typically has no integrity checks, so that a nefarious person could modify the license agreement information and present it to an unsuspecting user, leading to purposeful violation.

The techniques described herein improve clarity and accountability for every user by making small changes to software packages and the installation process. By way of example, one or more embodiments of the invention can include a software installation process that includes the following steps. A user selects and invokes the installation program, and the installation program presents the introductory panel. The user acknowledges the intent to install, and the installation program accesses the entitlement file stored in the software package, checks the integrity of the entitlement file and presents contents to the user for review. If the entitlement file has been modified, the user can be directed to contact the software enterprise.

Further, the user can acknowledge acceptance of the entitlement file information and intent to continue or cancel. The installation continues if the user accepts. The installation program presents the EULA information, and the user acknowledges acceptance of the EULA and intent to continue or cancel. Additionally, the installation program completes the tasks of system preparation, software component transfer and configuration.

Figure 5:
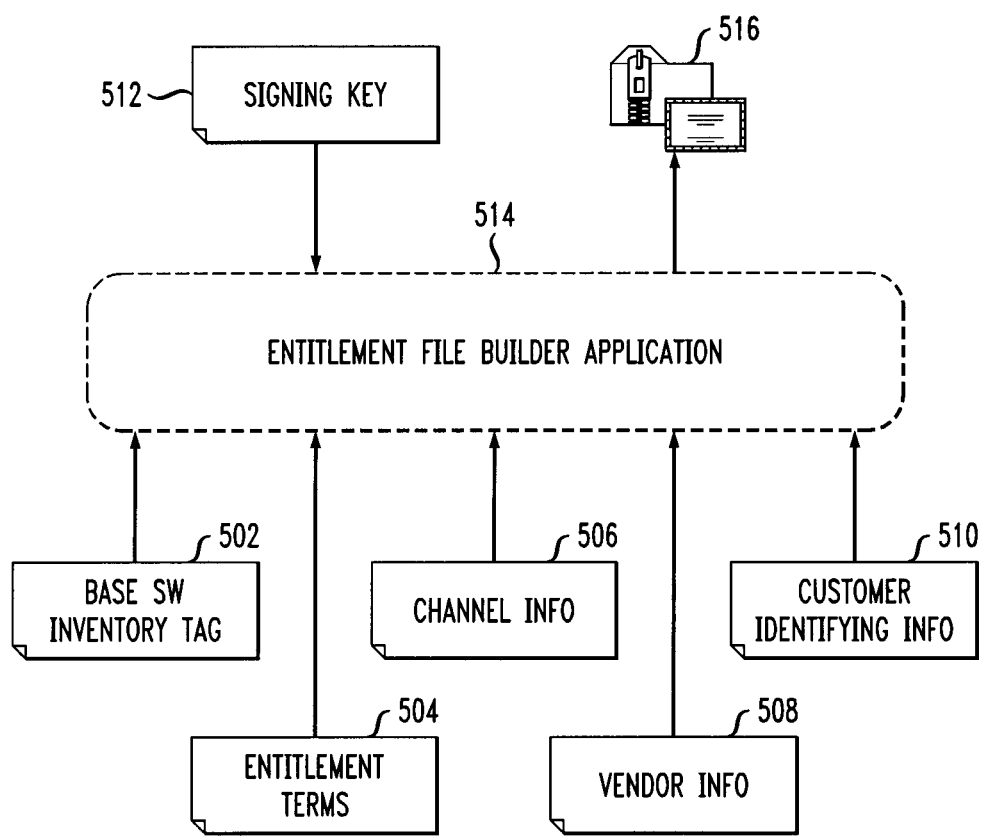
FIG. 5 is a diagram illustrating an exemplary creation of a tamper evident entitlement file, according to an embodiment of the present invention.

FIG. 5 is a diagram illustrating an exemplary creation of a tamper evident entitlement file, according to an embodiment of the present invention. By way of illustration, FIG. 5 depicts a base SW inventory tag 502, entitlement terms 504, channel info 506, vender information 508, customer identifying information 510 and a signing key 512, all of which provide input to the entitlement file builder application 514. The entitlement file builder application 514 provides input to the gold master with associated content 516. Also, cryptographic signing of the entitlement file binds the software package in a download request to a specific customer and terms.

One or more embodiments of the invention include ways by which one can protect the integrity of entitlement information. For example, a tamper-evident entitlement file can be created by combining information available at the time of fulfillment that is important for the vendor and the user, and provides traceability. Such a file can also be formatted using industry standard XML for maximum flexibility and usability, as well as protected using standard public key and/or private key cryptographic operations.

By way of example, the text in each entitlement file can be "signed" using a private key that is unique to an enterprise. Also, any modification to the text or the signature in an entitlement file will be detected when the signature is checked, and the electronic signature can be checked by software that has the matching public key. The contents and the signature on the entitlement file can be checked every time the software package is installed, and can also be checked periodically after the software package is installed by asset management and license management software.

Additionally, the entitlement file can follow the software package and be available for examination and validation throughout the entire lifecycle of the software package in any installation.

FIG. 6 is a diagram illustrating an exemplary portion of a sample signed XML entitlement file 602 viewed via a Web browser, according to an embodiment of the present invention. By way of illustration, FIG. 6 depicts vendor information 604, a digital signature technique 606 and a digital signature value 608.

Figure 7:
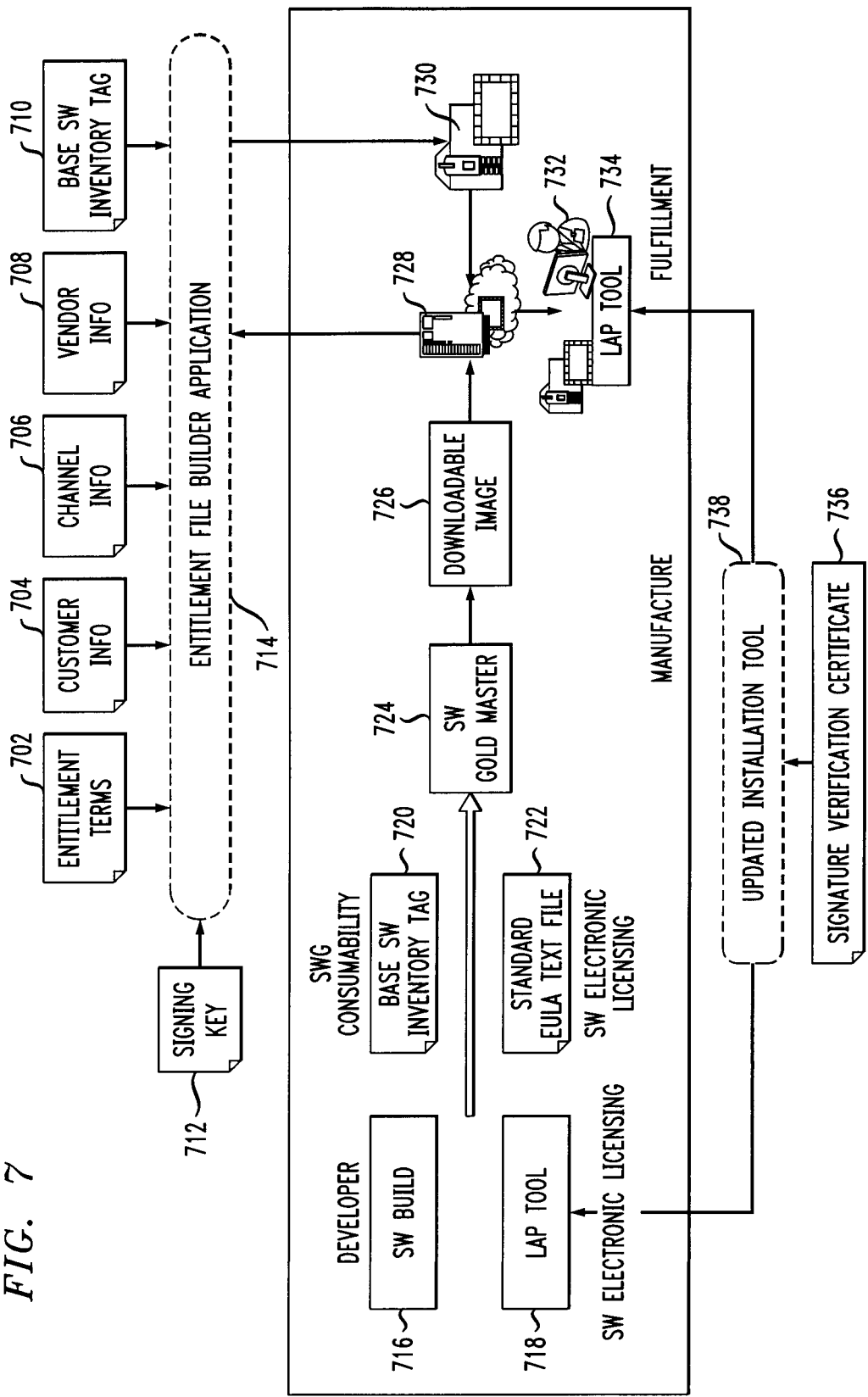
FIG. 7 is a diagram illustrating anti-piracy techniques, according to an embodiment of the present invention.

FIG. 7 is a diagram illustrating anti-piracy techniques, according to an embodiment of the present invention. By way of illustration, FIG. 7 depicts a base SW inventory tag 710, entitlement terms 702, channel info 706, vender information 708, customer information 704 and a signing key 712, all of which provide input to the entitlement file builder application 714. One or more embodiments of the invention include creating and attaching the signed entitlement file to the software package at the time of the download request, in a way that is transparent to the user.

The entitlement file builder application 714 provides input to the gold master with associated content 730, which forwards information to a computing system and/or service 728 that a requester 732 would use to request authorization to download a software package. FIG. 7 also depicts a software (SW) build component 716 and a LAP tool 718 that forward information to a base SW inventory tag 720, a standard EULA text file 722 and ultimately to a SW gold master component 724. The SW gold master component 724 provides input for a downloadable image 726, which forwards information to a user 732 and a LAP tool 734. FIG. 7 also depicts an updated installation tool 738, which receives a signature verification certificate 736 and forwards information to the LAP tool 734. Installation tools for various software packages can be modified for the updated user interface and entitlement file access.

One or more embodiments of the invention can, for example, provide deliverables such as new user interface (UI) panels, API, XML parsing, and cryptography support. Additionally, an exemplary entitlement file builder application can include customized content, a signing key and certificate, as well as a digital signature technique. An exemplary XML document format can include product information, vendor information, customer information, terms of entitlement, etc. One or more embodiments of the invention can also include an updated installation package as well as an updated SW delivery process.

FIG. 8 is a diagram illustrating exemplary operating scenarios for signed entitlement files as an anti-piracy control, according to an embodiment of the present invention. By way of illustration, FIG. 8 depicts a first scenario 802, a second scenario 804 and a third scenario 806. The first scenario 802 illustrates informing users and administrators of the origin and entitlement of software. The second scenario 804 illustrates informing an operations center and/or help desk when software installation anomalies occur. The third scenario 806 illustrates improving the compliance review process through service management automation to identify and restore software installation, licensing and/or anomalies.

Figure 9:
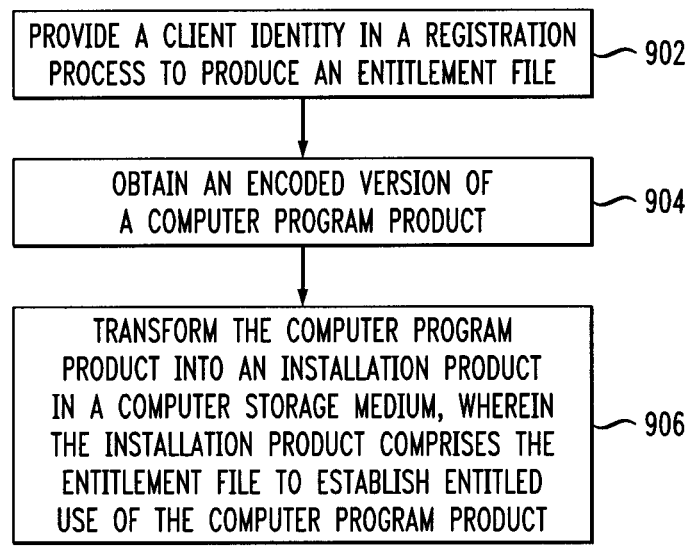
FIG. 9 is a flow diagram illustrating techniques for establishing entitlement to a computer program product, according to an embodiment of the present invention.

FIG. 9 is a flow diagram illustrating techniques for establishing entitlement to a computer program product, according to an embodiment of the present invention. Step 902 includes providing a client identity in a registration process to produce an entitlement file. Step 904 includes obtaining an encoded version of a computer program product. The encoded version of the computer program product can include, for example, a licensed program and a program identification, wherein the licensed program and the program identification are embedded together and encoded with a public key of a licensee.

Step 906 includes transforming the computer program product into an installation product in a computer storage medium, wherein the installation product comprises the entitlement file to establish entitled use of the computer program product. Entitled use can include, for example, use by a certified user (for example, a registered user, a legal owner, a licensee, etc.). The installation product can include an embedded copy of the client identity. Transforming the computer program product into an installation product in a computer storage medium can include, for example, changing the contents of a downloadable binary object by inserting the entitlement file and/or sending the entitlement file separately during the same download session.

As described herein, one or more embodiments of the invention use a cryptographic system such as, for example, a system that uses pairs of specially related numbers in performing math operations to obscure information (encrypt) or fingerprint information (sign). These pairs can be referred to as a public key and a private key. One or more embodiments of the invention use the private key to sign the information, while the verifier uses the public key to check the signature that is generated.

The techniques depicted in FIG. 9 can also include, for example, installing the computer program product by applying a signature key that generates evidence of ownership. Also, the licensee can decode the encoded version of the computer program product with a private key to receive clear versions of the licensed program and the program identification, and compare a decoded version of the program identification obtained from a licensor to the clear version of the program identification to verify that the correct software is received.

One or more embodiments of the invention can also include the licensee digitally signing the program identification, embedding the signature into the installation medium and obtaining a second installation medium that can be used to install the program one or more times. The techniques described herein also enable a subsequent licensee to create another installation product with an identity of the subsequent licensee embedded therein, as well as enable a subsequent licensee to change an original licensee identity in an original installation product.

Figure 10:
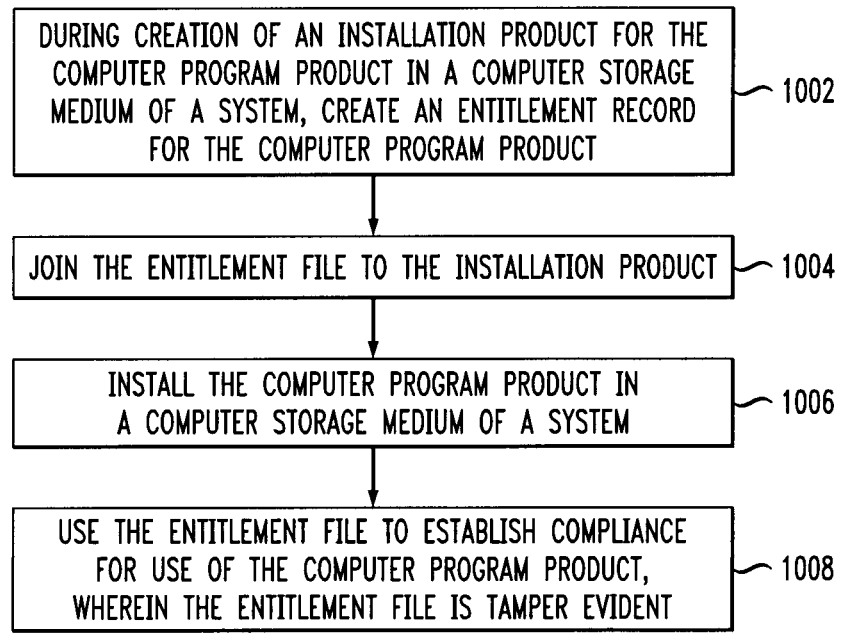
FIG. 10 is a flow diagram illustrating techniques for establishing compliance for use of a computer program product, according to an embodiment of the present invention.

FIG. 10 is a flow diagram illustrating techniques for establishing compliance for use of a computer program product, according to an embodiment of the present invention. Step 1002 includes during creation of an installation product for the computer program product in a computer storage medium of a system, creating an entitlement record for the computer program product. The entitlement file can include a format for an encoded entitlement document (for example XML).

Additionally, the entitlement file can include, by way of example, a vendor identifier, a user identifier, one or more transaction identifiers (such as date, time, contract number, etc.), an asset identifier (to include product name, service name, etc.) and/or one or more terms of entitlement (such as quantity, validity dates, service levels, etc.). Further, the entitlement file can be used to create instances of an entitlement document with embedded integrity metrics (for example, digital signing using public and/or private key cryptographic operations).

Step 1004 includes joining the entitlement file to the installation product. Step 1006 includes installing the computer program product in a computer storage medium of a system.

Step 1008 includes using the entitlement file to establish compliance for use of the computer program product, wherein the entitlement file is tamper evident. Using the entitlement file to establish compliance for use of the computer program product can include applying each term of an entitlement agreement throughout the lifecycle of the computer program product based on the integrity and content of the entitlement file. Also, using the entitlement file to establish compliance for use of the computer program product can include examining the entitlement file, wherein examining the entitlement file includes checking for integrity using a public cryptographic operation (such as signature verification), checking for integrity using a private cryptographic operation, checking each party, and/or checking each term of entitlement.

The techniques depicted in FIG. 10 also include auditing the computer program product for compliance, wherein the audit is based on the integrity and content of the entitlement file. Auditing the computer program product for compliance can include, for example, scanning a target system for the computer program product and associated entitlement file, and taking one or more actions based one or more predefined requirements (for example, enterprise and/or technical requirements). The actions can include, for example, ignoring the evidence of compliance or non-compliance (referred to herein as "ignore"), recording the evidence of the software compliance or non-compliance (for example, in a database) (referred to herein as "record"), and alerting the enterprise/operations desk/associated automation of evidence of compliance or non-compliance (referred to herein as "alert"). The actions can also include applying operational limitations on software based on entitlement terms or evidence of non-compliance (referred to herein as "limit"), and denying user the ability to install or operate software based on evidence of non-compliance (referred to herein as "deny").

As described herein, for example, in reference to component 126 of FIG. 1, once software is installed, the operation defined by component 124 can be invoked at any time. The result of the component 124 operation can be interpreted as evidence that the holder of the software is, or is not, entitled to operate the software. As noted above, actions (for example, ignore, record, alert and/or deny) are steps that the verifier can take, depending upon the evidence provided by FIG. 1 component 124 operation.

By way of example, FIG. 8 provides three examples of operational scenarios where the verification is performed and an action is taken. In block 802, the user/administrator may select an action from the available alternatives, given some evidence. In block 804, the enterprise operations desk person or associated automation may select an action from the available alternatives, given some evidence when software is installed. In block 806, the enterprise operations desk person or associated automation may select an action from the available alternatives, given some evidence when computing systems are scanned for compliance. The range of actions and the selected action can be dependent on the policy that is set by the enterprise.

Additionally, one or more embodiments of the invention include providing a computer program product installation process. The computer program product installation process can include, by way of example, accessing the entitlement file in the computer program product, checking integrity of the entitlement file, presenting content of the entitlement file to a user for review and continuing the computer program product installation process if the user acknowledges acceptance of the entitlement file and intent to continue. The computer program product installation process can also include, for example, presenting end user license agreement (EULA) information to the user for review and completing the software installation if the user acknowledges acceptance of the EULA and intent to continue.

Figure 11:
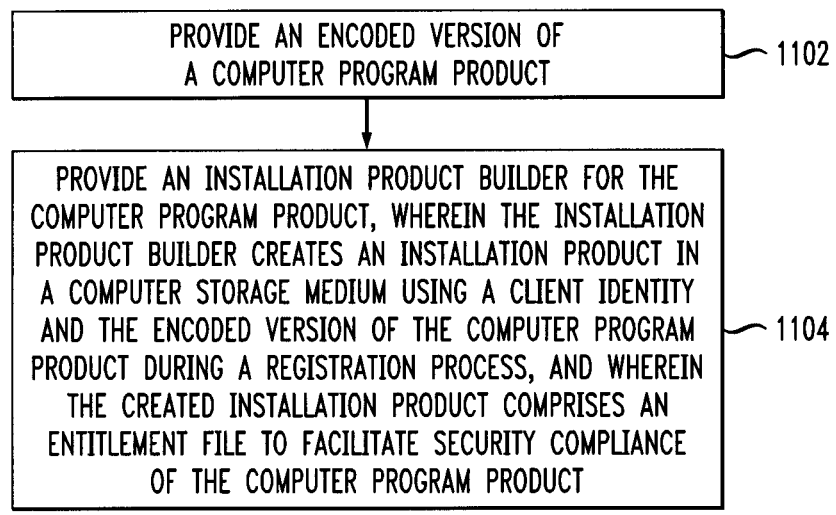
FIG. 11 is a flow diagram illustrating techniques for facilitating security compliance of a computer program product, according to an embodiment of the present invention.

FIG. 11 is a flow diagram illustrating techniques for facilitating security compliance of a computer program product (for example, with the elements provided in a computer storage memory), according to an embodiment of the present invention. Step 1102 includes providing an encoded version of a computer program product. Step 1104 includes providing an installation product builder for the computer program product, wherein the installation product builder creates an installation product in a computer storage medium using a client identity and the encoded version of the computer program product during a registration process, and wherein the created installation product comprises an entitlement file to facilitate security compliance of the computer program product.

As depicted in FIG. 11, the computer program product can include computer useable program code that is stored in a computer readable storage medium in a data processing system, and wherein the computer useable program code was downloaded over a network from a remote data processing system. Also, in one or more embodiments of the invention the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 12:
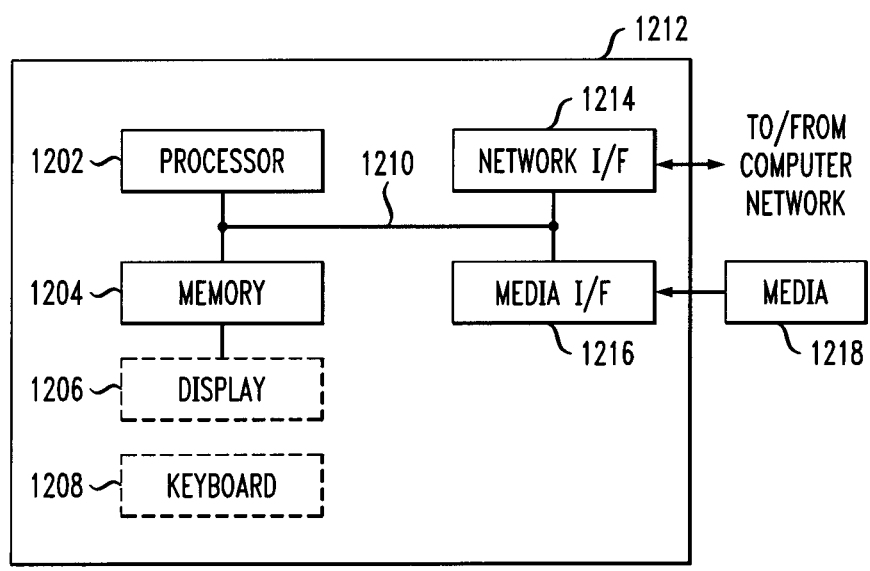
FIG. 12 is a system diagram of an exemplary computer system on which at least one embodiment of the present invention can be implemented.

One or more embodiments can make use of software running on a general purpose computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1218) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 1204), magnetic tape, a removable computer diskette (for example media 1218), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 1202 coupled directly or indirectly to memory elements 1204 through a system bus 1210. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowcharts and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). For example, FIG. 4 depicts a composite illustration that includes the components of an exemplary implementation, the grouping of components into functional assemblies and the interaction or flow of information among the components and/or assemblies.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, anti-piracy mechanisms that include pre-deployment registration.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for establishing entitlement to a computer program product, comprising the steps of:
    obtaining from a licensor of a computer program product, a certified client identity of a licensee of the computer program product, wherein said certified client identity comprises licensee identification information, and cryptographic keys comprising a private key of the licensee and a signature verification public key of the licensor, wherein the certified client identity is generated and utilized by the licensor in a pre-deployment registration process to produce an entitlement file that is unique to said certified client identity, wherein the pre-deployment process is performed by the licensor prior to making the computer program product available to the licensee;
    obtaining the entitlement file from the licensor which is digitally signed with a private key of the licensor of the computer program product, wherein the entitlement file specifies terms of the licensee's entitled use of the computer program product;
    obtaining from the licensor an encoded version of the computer program product which is encoded with a public key of the licensee;
    transforming the encoded version of the computer program product into an installation product in a computer storage medium using the certified client identify and the private key of the licensee; and during the transforming, automatically performing a registration process using the entitlement file to establish entitled use of the computer program product by the licensee and to include registration information within the installation product, wherein the transforming and registration process comprises:

decoding the encoded version of the computer program product using the private key of the licensee;

decoding a digital signature associated with the entitlement file using the signature verification public key of the licensor to verify that the terms of the licensee's entitled use of the computer program product as provided by the entitlement file are valid; and automatically verifying the licensee's entitled use of the computer program product using the validated terms of the licensee's entitled use as specified by the entitlement file; and enabling installation of the computer program product if the licensee's entitled use of the computer program product is verified by the registration process;

wherein said method comprises an automated process that is performed by a computer executing program instructions.

2. The method of claim 1, further comprising:

generating a digital signature of the licensee by digitally signing at least the licensee identification information using the private key of the licensee;

generating the installation product by embedding the digital signature of the licensee and the entitlement file and the associated digital signature into the decoded computer program product;

storing the installation product in a computer storage device.

3. The method of claim 1, wherein the encoded version of the computer program product comprises a licensed program and a program identification, wherein the licensed program and the program identification are embedded together and encoded with the public key of the licensee.

4. The method of claim 3, wherein the encoded version of the computer program product is decoded with the private key of the licensee to receive clear versions of the licensed program and the program identification.

5. The method of claim 4, further comprising comparing a decoded version of the program identification obtained from the licensor to the clear version of the program identification to verify that the correct software is received.

6. The method of claim 1, wherein the installation product comprises an embedded copy of the client identity.

7. The method of claim 1, further comprising the steps of:

enabling the licensee to create another installation product with an identity of a subsequent licensee embedded therein, wherein said subsequent licensee is a licensee that is issued subsequent to an initial licensing of an original licensee; and enabling the subsequent licensee to change an original licensee identity in an original installation product.

8. The method of claim 1, wherein transforming the computer program product into an installation product in a computer storage medium comprises changing a content of a downloadable binary object by inserting the entitlement file.

9. The method of claim 1, further comprising receiving the entitlement file separately during a download session for the installation product.

10. An apparatus, comprising:

a memory configured to store program instructions; and a processor coupled to the memory and configured to execute the program instructions to implement a process for establishing entitlement to a computer program product, wherein the process comprises:

obtaining from a licensor of a computer program product, a certified client identity of a licensee of the computer program product, wherein said certified client identity comprises licensee identification information, and cryptographic keys comprising a private key of the licensee and a signature verification public key of the licensor, wherein the certified client identity is generated and utilized by the licensor in a pre-deployment registration process to produce an entitlement file that is unique to said certified client identity, wherein the pre-deployment process is performed by the licensor prior to making the computer program product available to the licensee;

obtaining the entitlement file from the licensor which is digitally signed with a private key of the licensor of the computer program product, wherein the entitlement file specifies terms of the licensee's entitled use of the computer program product;

obtaining from the licensor an encoded version of the computer program product which is encoded with a public key of the licensee;

transforming the encoded version of the computer program product into an installation product in a computer storage medium using the certified client identify and the private key of the licensee; and during the transforming, automatically performing a registration process using the entitlement file to establish entitled use of the computer program product by the licensee and to include registration information within the installation product, wherein the transforming and the registration process comprises:

decoding the encoded version of the computer program product using the private key of the licensee;

decoding a digital signature associated with the entitlement file using the signature verification public key of the licensor to verify that the terms of the licensee's entitled use of the computer program product as provided by the entitlement file are valid; and automatically verifying the licensee's entitled use of the computer program product using the validated terms of the licensee's entitled use as specified by the entitlement file; and enabling installation of the computer program product if the licensee's entitled use of the computer program product is verified by the registration process.

11. The apparatus of claim 10, wherein the process further comprises:

generating a digital signature of the licensee by digitally signing at least the licensee identification information using the private key of the licensee;

generating the installation product by embedding the digital signature of the licensee and the entitlement file and the associated digital signature into the decoded computer program product;

storing the installation product in a computer storage device.

12. The apparatus of claim 10, wherein the encoded version of the computer program product comprises a licensed program and a program identification, wherein the licensed program and the program identification are embedded together and encoded with the public key of the licensee.

13. The apparatus of claim 12, wherein the encoded version of the computer program product is decoded with the private key of the licensee to receive clear versions of the licensed program and the program identification.

14. The apparatus of claim 13, wherein the process further comprises comparing a decoded version of the program identification obtained from the licensor to the clear version of the program identification to verify that the correct software is received.

15. The apparatus of claim 10, wherein the installation product comprises an embedded copy of the client identity.

16. The apparatus of claim 10, wherein the process further comprises:
   enabling the licensee to create another installation product with an identity of a subsequent licensee embedded therein, wherein said subsequent licensee is a licensee that is issued subsequent to an initial licensing of an original licensee; and
   enabling the subsequent licensee to change an original licensee identity in an original installation product.

17. The apparatus of claim 10, wherein transforming the computer program product into an installation product in a computer storage medium comprises changing a content of a downloadable binary object by inserting the entitlement file.

18. The apparatus of claim 10, wherein the process further comprises receiving the entitlement file separately during a download session for the installation product.

* * * * *